US012798706B2

(12) United States Patent
van den Heuvel et al.

(10) Patent No.: US 12,798,706 B2
(45) Date of Patent: Nov. 17, 2026

(54) RAILING ARRANGEMENT FOR A LOADING PLATFORM OF A UTILITY VEHICLE

(71) Applicant: Ford Global Technologies, LLC, Dearborn, MI (US)

(72) Inventors: Bas van den Heuvel, Wijnandsrade (NL); Rob Stalman, Selfkant (DE); Mark Gijbels, Vlaams-brabant (BE); Rainer Souschek, Aachen (DE); Martin Kapp, Dormagen (DE); Pieter Diepenmaat, Rotterdam (NE); Wouter van der Hoog, Dearborn, MI (US)

( * ) Notice: Subject to any disclaimer, the term of this patent is extended or adjusted under 35 U.S.C. 154(b) by 430 days.

(21) Appl. No.: 18/536,213

(22) Filed: Dec. 11, 2023

(65) Prior Publication Data

US 2024/0190524 A1 Jun. 13, 2024

(30) Foreign Application Priority Data

Dec. 12, 2022 (DE) ......................... 102022132925.9

(51) Int. Cl.
*B62D 63/04* (2006.01)

(52) U.S. Cl.
CPC .................................... *B62D 63/04* (2013.01)

(58) Field of Classification Search
CPC ... B62D 63/04; B62D 53/0857; B60P 1/4457; B60P 1/43; B60P 1/436; B60P 1/431; B60P 1/432; B60P 1/434; B60P 1/435; B60P 3/224; B60R 3/005; B60R 2021/028; B65G 69/2876
USPC ........... 414/373, 430, 345, 346, 537; 296/61
See application file for complete search history.

(56) References Cited

U.S. PATENT DOCUMENTS 4,457,402 A * 7/1984 Del Vecchio ......... B66B 9/0869
105/449

FOREIGN PATENT DOCUMENTS

BR 102013008928 A2 * 5/2015

OTHER PUBLICATIONS

Retracta-Belt Stanchions; https://www.visiontron.com/jetblue-terminal-5-customs-and-border-area-at-jfk-airport-in-new-york-city-t5i/; JetBlue; accessed Apr. 9, 2026; published Nov. 2014 (Year: 2014).*

Fixed Wall Mount Retractable Belt Barrier; https://www.amazon.com/Fixed-Retractable-Barrier-WMB-120-Yellow/dp/B07VQ91NRR/ref=asc_df_B07VQ91NRR?tag=bingshoppinga-20&linkCode=df0&hvadid=79852242641671&hvnetw=o&hvqmt=e&h; Crowd Control Warehouse; accessed Apr. 9, 2026; published Jul. 29, 2019 (Year: 2019).*

(Continued)

*Primary Examiner* — Amy R Weisberg
*Assistant Examiner* — Alma D. Schuster
(74) *Attorney, Agent, or Firm* — Emily Campbell; Eversheds Sutherland (US) LLP

(57) ABSTRACT

The invention relates to a railing arrangement for a loading platform of a utility vehicle, which railing arrangement, in a state of use, extends distally away from a loading opening of the utility vehicle in a longitudinal direction, having two railing units, the proximal ends of which are fastenable to both sides of the loading opening in a transverse direction and the distal ends of which are fastenable in the region of a distal end edge of the loading platform, such that at least one railing unit is inclined toward the transverse direction in relation to the longitudinal direction and the two railing units define a walkable area that becomes narrower, in the transverse direction, toward the distal end edge.

20 Claims, 6 Drawing Sheets

(56) References Cited

OTHER PUBLICATIONS

Loading Dock Barrier | Safety Barrier; youtube.com video; youtube.com/watch?v=vcmNoehDUZw; Akon Skirting; accessed Apr. 8, 2026; published May 24, 2021. (Year: 2021).*
Telescopic Fence; https://www.made-in-china.com/showroom/emmacologne/product-detailCXxnyEmrmzYQ/China-Telescopic-Fence.html; Beijin Cologne Co., Ltd; accessed Apr. 13, 2026; published Jan. 3, 2018 (Year: 2018).*

* cited by examiner

RAILING ARRANGEMENT FOR A LOADING PLATFORM OF A UTILITY VEHICLE

CROSS-REFERENCE TO RELATED APPLICATIONS

The applications claims priority to and the benefit of German Application No. 102022132925.9, filed Dec. 12, 2022, which is hereby incorporated by reference herein in its entirety.

FIELD OF THE INVENTION

The invention relates to a railing arrangement for a loading platform of a utility vehicle.

BACKGROUND

Utility vehicles such as delivery vehicles or trucks often have a loading ramp or loading platform which, during the loading and unloading of freight, forms a stable underlying surface on which freight can be temporarily received and on which a person can stand whilst handling the freight. The loading platform, which is generally arranged at the rear end, may be pivotable and/or height-adjustable such that it can be accommodated in space-saving fashion when not in use and can be used, and/or differently inclined, in order to raise and lower freight. The latter may serve for bridging a height difference between a cargo floor of the utility vehicle and a platform or the like to which access is to be gained.

In order to ensure the safety of the freight and the safety of persons working on the loading platform, it is known for safety railings to be provided at the sides of the platform, which safety railings can be attached or pivoted out when required. Particular problems however arise example during a vehicle-to-vehicle (V2V) cargo exchange, where a transfer takes place directly from one vehicle to another, with a transition possibly being created between two loading platforms of the two vehicles. To make V2V exchange possible, cargo and persons move even in the region of the outermost edge of the loading platform, which may be arranged at a considerable distance above the ground. This constitutes an extreme situation, in particular because the transition to the other vehicle may be suboptimal. For example, the loading platform may not be correctly aligned with respect to the other vehicle, and/or the other vehicle could have a loading platform of smaller width. In the latter case, the usable width thus becomes smaller in the transition from one loading platform to the other, with the result that an inattentive user could end up in an extreme situation there. The side regions can be made safe using additional railings, which increase the weight of the vehicle and must be stowed when not in use. Additional railings also complicate the setup and dismantling operations. Aside from the aspect of extreme situations, the efficiency of the transfer operation must also be considered. If the alignment of the loading platforms is not optimal and/or said loading platforms are of different width, a person must, for example when transferring trolleys or the like, pay closer attention or exert more force in order to steer the trolleys. This can make the transfer operation slower.

US 2018/0 056 842 A1 discloses a railing for protecting persons and payloads on tail lifts, said railing consisting of at least two independently movable railing parts, each railing part being pivotably articulated at its position on the platform of the tail lift. Here, railing parts may be arranged rotatably on outer joints, wherein the joint consists of a base plate that has an opening for receiving a tilting lever.

CN 213 035 872 U presents a transfer device comprising a first vehicle plate and a second vehicle plate, wherein universal wheels are arranged symmetrically on the undersides of the first vehicle plate and of the second vehicle plate, and an adjusting plate is arranged between the first vehicle plate and the second vehicle plate.

DE 296 08 955 U1 has disclosed a loading device for use in road vehicles that have a cargo space that can be loaded via a rear flap or door. The loading device has a guide unit, which is fastenable to the floor of the cargo space, and at least one loading plate, which is provided movably on the guide unit and which is movable from a transport position within the cargo space into a loading or unloading position in which the loading plate is situated outside the vehicle, behind the rear end of the vehicle.

JP 3088406 B2 discloses a seat activation device for generating movements, including raising and lowering, of a seat, for example of a chair having a seat on which a user sits. The seat activation device comprises a movable seat support device for supporting the seat in order to generate a combination of raising and lowering and tilting of the seat, and comprises a drive device for driving the movable seat support device.

In view of the prior art highlighted, there is still room for improvement in safeguarding persons and freight on a loading platform, in particular during a vehicle-to-vehicle transfer operation.

SUMMARY

It is the object of the invention to specify a loading platform that is improved from the aspect of extreme situations for persons and freight.

According to the invention, the object is achieved by means of a railing arrangement having the features of claim 1, wherein the subclaims relate to advantageous refinements of the invention.

Note that the features and measures individually specified in the following description may be combined with one another in any technically meaningful way and reveal further refinements of the invention. The description additionally characterizes and specifies the invention, in particular in conjunction with the figures.

The invention provides a railing arrangement for a loading platform of a utility vehicle. The utility vehicle is a road vehicle which is motor-powered, wherein this is intended to encompass all possible drives such as internal combustion engines, electric motors and/or combinations of these. In particular, it may be a light, medium or heavy truck, which also encompasses delivery vehicles. The loading platform is normally arranged pivotably and/or height-adjustably on a vehicle body of the utility vehicle, and allows easy access to a cargo space of same. During the loading and unloading of freight, said loading platform forms a stable underlying surface on which freight can be temporarily received and on which a person can stand whilst handling the freight. Said loading platform, when pivoted into an upright position, can also serve to close off the cargo space. Said loading platform is generally arranged at a rear end, though this is not essential to the invention. At least in some embodiments, the railing arrangement may also be referred to as a railing. Said railing arrangement forms an anti-fall barrier, that is to say a barrier situated to the side in a horizontal direction, for persons and/or objects on the loading platform.

The railing arrangement, in a state of use, extends distally away from a loading opening of the utility vehicle in a longitudinal direction. The loading opening is an access opening to a cargo space of the utility vehicle. Said loading opening is normally arranged at a rear end. The longitudinal direction normally coincides with the longitudinal direction or longitudinal axis of the utility vehicle, because the loading platform is normally arranged at a rear end, behind the loading opening. The railing arrangement typically proceeds from a region directly at the access opening, though could also extend into the cargo space. That part of the railing arrangement which, with respect to the longitudinal direction, is arranged at the loading opening is referred here as being proximal, whilst that part which is remote respect to the longitudinal direction is referred to as being distal. The same applies to the loading platform. The state of use refers to the state in which the railing arrangement is usable and can perform its safety function.

The railing arrangement has two railing units, the proximal ends of which are fastenable to both sides of the loading opening in a transverse direction and the distal ends of which are fastenable in the region of a distal end edge of the loading platform, such that at least one railing unit is inclined toward the transverse direction in relation to the longitudinal direction and the two railing units define a walkable area that becomes narrower, in the transverse direction, toward the distal end edge. The railing units are normally separate from one another, that is to say are connected to one another only indirectly, for example via parts of the utility vehicle, in the state of use. Each railing unit is configured to form a barrier on one side of the loading platform. The proximal ends of the railing units are fastenable to both sides of the loading opening, that is to say on opposite sides (for example "left" and "right") of the loading opening, in the transverse direction. This includes the possibility of the proximal ends being arranged within the cargo space or outside, for example on the loading platform. Said proximal ends are fastenable, which includes the possibility that they are fastened to both sides of the loading opening permanently, both when in use and when not in use. The distal ends of the railing units are fastenable in the region of the distal end edge of the loading platform. Said distal ends may be, but are not necessarily, fastened to the loading platform. They may also extend beyond the loading platform. The distal end edge is the edge which, with respect to the longitudinal direction, is situated opposite the loading opening, that is to say that edge of the loading platform which is furthest remote from the loading opening.

In general, each railing unit has a handrail unit which forms the uppermost part of the railing unit and which extends along a horizontal direction, but which does not necessarily run horizontally. Said handrail unit extends above the loading platform at a height at which it can actually be used as a handrail for persons, that is to say for example at least 80 cm above the loading platform. However, in this context, the term "handrail unit" is not necessarily linked to a minimum height.

Here, at least one railing unit extends neither parallel nor at a right angle with respect to the longitudinal direction but obliquely with respect thereto. Said at least one railing unit is inclined toward the transverse direction in relation to the longitudinal direction. The angle of inclination with respect to the longitudinal direction is normally between 5° and 50°, though smaller or larger angles of inclination are also possible. A walkable area is formed between the two railing units. This is the area that is bounded to both sides in the transverse direction by the railing units. In this area, persons can move, and objects such as trolleys can be moved, whilst being safeguarded to the sides by the railing units. The walkable area becomes narrower, in the transverse direction, toward the distal end edge. This means that the extent of the walkable area in the transverse direction, its "width", decreases toward the distal end edge. This is the result of the oblique positioning of the at least one railing unit.

Adequate safeguarding of persons and objects on the loading platform can be ensured by means of the railing arrangement according to the invention, even if only a relatively narrow area can be safely walked upon beyond, that is to say distally with respect to, the end edge. This may be the case in particular when directly transferring cargo onto another vehicle which has a narrower cargo space than the utility vehicle itself or which has a cargo space that is narrower in the transverse direction than the loading platform. The railing units may be fastened such that the spacing of the distal ends in the transverse direction at least approximately corresponds to the width of the walkable area (for example of the cargo space of the other vehicle) distally with respect to the end edge. The oblique arrangement of the railing unit with respect to the longitudinal direction is also advantageous here. Not only is safeguarding possible in this way, but trolleys can also, to a certain degree, be smoothly guided on the loading platform to the distal exit of the walkable area. That is to say, the railing unit can, to a certain degree, function as a guide element or guardrail.

In one embodiment, at least one railing unit has a flexible handrail element that can be rolled up when not in use. The handrail element may be designed for example as a strap, rope or chain. It may for example be manufactured entirely or partially from natural fibers, synthetic fibers or metal fibers. If it is designed as a chain, the chain links may in particular consist of metal or plastics or composite material such as CRP or GRP. It is any case flexible and of non-rigid overall form. Accordingly, it can for example be stretched out and arranged in straight form for use, whilst it can be rolled up in space-saving fashion when not in use. As an alternative to rolling up, storage in some other form would also be conceivable, for example by virtue of the handrail element being folded up in an ordered or disordered manner. In addition to its flexible characteristic, the handrail element could optionally also be elastic. In general, however, the handrail element is advantageously tension-resistant, that is to say varies in length only insignificantly, under normal usage conditions. An elastic change in length generally degrades the safety function of the handrail element.

In one refinement, the flexible handrail element can be rolled up on a spool unit which is arranged on the utility vehicle and which is arrestable in order to fix an unrolled length of the handrail element. That is to say, the handrail element can be entirely or partially unrolled from the spool unit, and it can likewise be entirely or partially rolled up onto the spool unit. The spool unit normally has a rotatably mounted roller or spool. The roller may also be preloaded by a spring element, such that the handrail element can be rolled up automatically. Here, the roller is arrestable about its axis of rotation, such that a rotation is prevented. This firstly prevents the handrail element from rolling up when this is not desired. Secondly, unrolling is also prevented, which would otherwise have the effect of the handrail element simply giving way under load, forfeiting its safety function.

A further refinement provides for at least one railing unit to have a handrail element having multiple telescopically interconnected segments. The individual segments are substantially rigid, inflexible and/or dimensionally stable. As materials, use may for example be made of metals such as steel or aluminum alloys or of plastics or composite materials such as CRP or GRP. The segments can be pushed onto one another, whereby the effective length of the handrail element can be varied. A segment may have a hollow profile into which another segment can be pushed. A partially open profile would also be conceivable if it forms the required guide for the other segment. Depending on the embodiment, even only two segments may be advantageous, though the handrail element may also have three or more segments.

At least one railing unit may have a handrail element having multiple rigid segments which are connected by at least one flexible strap element and which are couplable to one another for use and which are decouplable from one another when not in use. The flexible strap element is normally non-rigid and can thus be shaped as required without significant resistance. It may be designed as a strap or optionally also as a rope or chain. Its function consists firstly in captively connecting the segments to one another. It may be led through passage openings in the individual segments. The length of the strap element exceeds the total length of the segments when they have been coupled together. The segments can thus be decoupled from one another whilst remaining connected by the strap element. The individual segments are normally coupled at least in part by way of a form fit, though magnetic coupling would for example also be conceivable. The connection may preferably be strengthened by virtue of a tensile force being exerted, for example proceeding from the proximal end, on the segment arranged at the distal end, such that all of the segments are pulled together and thus held against one another. In particular in conjunction with a form fit, this gives rise to a firm connection of the segments, such that these practically form a single rigid unit.

In one embodiment, a distal end of at least one railing unit may be designed to be coupled to a securing unit at a loading opening of another vehicle. That is to say, in this case, the railing arrangement also has at least one securing unit which is assigned not to the same vehicle as the loading platform but to a different vehicle, which may in particular likewise be a utility vehicle. The corresponding distal end and the securing unit have structures which are couplable to one another, typically by way of a form fit. Such a securing unit may for example be arranged to the side of the loading opening of the other vehicle. In this way, it can be easily ensured that the railing unit is optimally aligned relative to the other loading opening. The securing unit may optionally be height-adjustable or at least allow a connection of the railing unit at different heights.

A distal end of at least one railing unit is advantageously designed to be connected to the loading platform in the region of the distal end edge. Typically, though not imperatively, the loading platform has connecting structures that are coordinated with corresponding connecting structures of the railing unit. The connection may typically be produced by way of a form fit. The distal end of the railing unit is advantageously connectable to the loading platform at different positions.

In order, inter alia, to allow the connections to be made at different positions, the loading platform may have multiple connecting structures, each of which is configured to be connected to a distal end of a railing unit. Since elevated connecting structures could restrict the general usability of the loading platform, the connecting structures are advantageously designed as apertures with which the railing unit can form-fittingly engage. To secure the railing unit when not in use, corresponding connecting structures may also be provided within the cargo space, for example in or on the cargo floor. For example, the railing unit can be pivoted about the proximal end, whereby the distal end is moved into the cargo space, where it can engage with the connecting structures.

One refinement provides for at least one railing unit to have a handrail element and to have a post element which is at least connectable to said handrail element and which is configured to be connected to the loading platform. The post element is normally of straight overall form and extends at least in the direction of the vertical axis, optionally also parallel thereto, when connected in the intended manner to the loading platform. Said post element may be permanently connected to the handrail element or may be designed for connection to the handrail element, wherein the two elements can be taken apart and stored separately when not in use. Such a post element may be arranged at the distal end. Alternatively or in addition, however, a post element may also be arranged at the proximal end and/or between the two ends. The post element may have the aforementioned connecting structures that interact with connecting structures of the loading platform. For example, a lower end of the post element may be insertable into an aperture within the loading platform. It is preferred here that at least one post element is connectable to the loading platform at different angles of inclination relative to the loading platform. For example, the aperture may be formed such that the post element can be tilted to different degrees after having been inserted. It is thus possible for the post element to be oriented vertically even when the loading platform is in an inclined position in order to compensate for a height difference.

The relevant proximal end of the railing unit could be arranged in exactly one position on the utility vehicle (for example at the loading opening or in the cargo space). Adjustability may however also be expedient, such that different positions of the proximal end, and if necessary of the railing unit as a whole, can be implemented. In particular, a proximal end of at least one railing unit may be height-adjustably and/or pivotably connected to the utility vehicle. The height adjustability is expedient for example if a post element of a given length is used, wherein the loading platform can assume different degrees of inclination, such that the post element as a whole can be arranged at different heights relative to the loading opening. By means of a height-adjustable proximal end, the handrail element can be oriented horizontally irrespective of the height of the post element. It would alternatively also be conceivable for the handrail element to be arranged height-adjustably on the post element. The height adjustability should not impair the safety of the railing unit, for which reason the proximal end is preferably arrestable in a vertical position, thus preventing an undesired height adjustment. The pivoting capability may be provided in particular about the vertical axis for the purposes of implementing different orientations of a handrail element on which the proximal end is arranged. In this way, the orientation of an intrinsically rigid handrail element can be varied.

BRIEF DESCRIPTION OF THE DRAWINGS

Further advantageous details and effects of the invention will be discussed in more detail below on the basis of various exemplary embodiments illustrated in the figures, in which.

DETAILED DESCRIPTION

In the various figures, identical parts are always denoted by the same reference designations, for which reason said parts will generally also be described only once.

Figure 1:
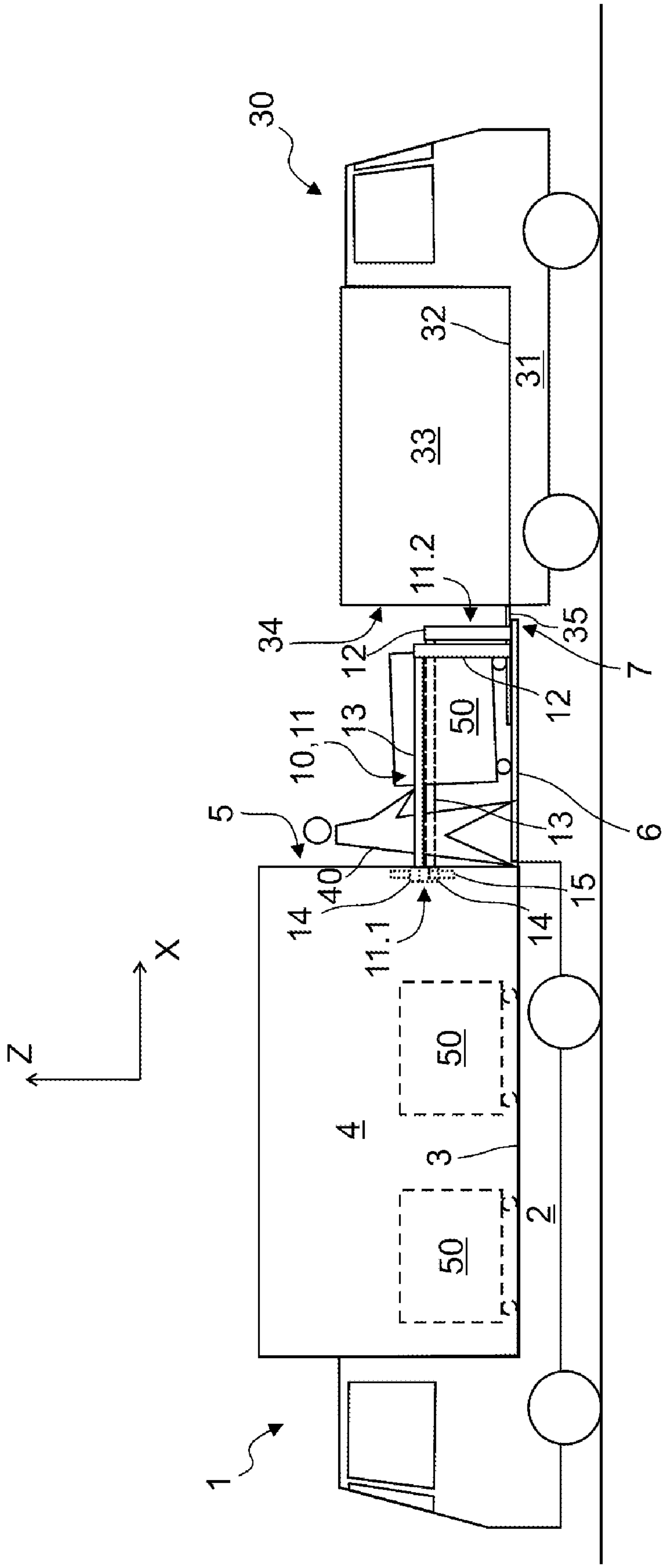
FIG. 1 shows a side view of a utility vehicle having a loading platform and having a railing arrangement according to a first embodiment, and of a further utility vehicle, during a payload exchange.

FIG. 1 shows a first utility vehicle, in this case a light truck 1, which has a vehicle body 2 with a cargo space 4 arranged thereon, said cargo space being downwardly delimited by a cargo floor 3. Arranged in the cargo space 4 are multiple trolleys 50 that can accommodate different payloads. Also shown is a second utility vehicle, which in this example is an LEFV 30 (LEFV, light electric freight vehicle). This likewise has a vehicle body 31 and a cargo space 33 with a cargo floor 32. For a direct payload exchange, the two utility vehicles 1, 30 are positioned such that their rear ends face toward one another. A movable loading platform 6 of the truck 1 has been pivoted into a horizontal position and is pointing toward the LEFV 30, with a distal end edge 7, in relation to a longitudinal direction X, of the loading platform 6 being arranged adjacent to the LEFV 30. As a result of the loading platform 6 having been pivoted down, a loading opening 5 into the cargo space 4 has been opened. A bridging element 35 of the LEFV 30 has been pivoted into a horizontal position and is lying on the loading platform 6. The cargo space 32 is accessible via a loading opening 34. As indicated in FIG. 1, trolleys 50 can be transported between the cargo spaces 4, 32 by a person 40 via the loading platform 6 and the bridging element 35.

In order to prevent one of the trolleys 50 or the person 40 from ending up in an extreme situation, a railing arrangement 10 is provided, which has two railing units 11. These railing units 11 are mutually spaced in a transverse direction Y and each extend in the longitudinal direction X. Each railing unit 11 extends from a proximal end 11.1, to the side of the loading opening 5, to a distal end 11.2, close to the end edge 7. Arranged at the proximal end 11.1 is a pivot bearing 14 to which a handrail element 13 is connected, said handrail element thus being pivotable about a vertical direction Z. The pivot bearing 14 is furthermore height-adjustable on a guide rail 15, whereby a vertical position of the handrail element 13 can also be varied. The handrail element 13 is connected, at the distal end 11.2, to a post element 12 which is of elongate and straight form and which extends parallel to the vertical direction Z. The handrail element 13 and the post element 12 are intrinsically rigid and are rigidly connected to one another.

Figure 2:
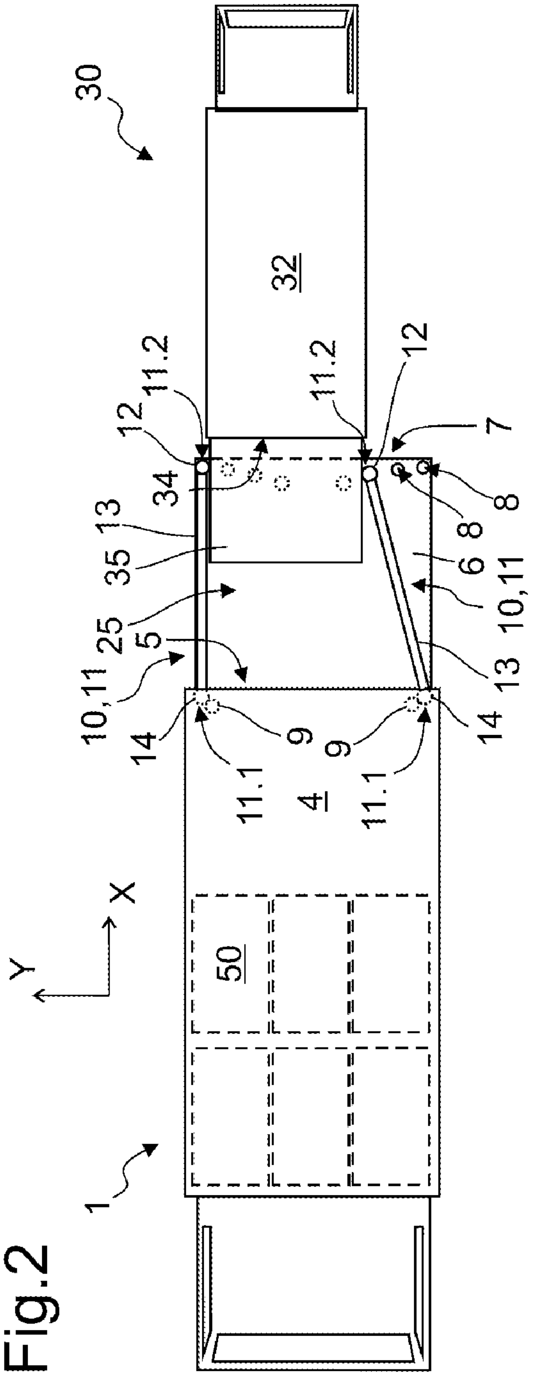
FIG. 2 shows a plan view of the vehicles from FIG. 1.

As can be seen in the plan view in FIG. 2, the loading opening 5 of the truck 1 is significantly wider than the loading opening 34 of the LEFV 30. Accordingly, along the transverse direction Y, a part of the loading platform 6 does not overlap the loading opening 34. A corresponding part of the end edge 7 is thus free, which constitutes a particular aspect for the person 40 and trolley 50 that are moving in the longitudinal direction X toward the end edge 7. To allow for this, one of the railing units 11 is arranged obliquely with respect to the longitudinal direction X, such that the two railing units 11 between them define a walkable area 25 that becomes narrower, in the transverse direction Y, toward the distal end edge. The width of the walkable area 25 close to the end edge 7 approximately corresponds to that of the loading opening 34. In order to implement the illustrated oblique positioning, and various other positions, of the railing unit 11, the loading platform 6 has multiple apertures 8 into which the post elements 12 can be selectively inserted. Here, the apertures 8 lie on a circular arc that is centered about the relevant pivot bearing 14.

Figure 3:
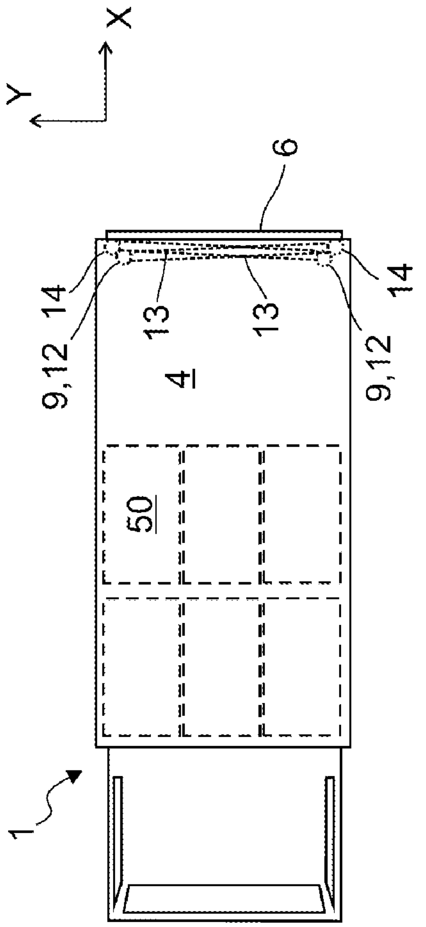
FIG. 3 shows a plan view of the utility vehicle from FIG. 1 in a driving state.

FIG. 3 shows the truck 1 in a driving position, in which the loading platform 6 has been moved up into a vertical position in which it closes the loading opening 5. The two railing units 11 have been pivoted into the cargo space 4 about the pivot bearings 14 and are thus received in space-saving fashion. As indicated in FIG. 2, the cargo floor 4 may likewise have apertures 9 in which the lower ends of the post elements 12 can be received in order to secure them against movement.

Figure 4:
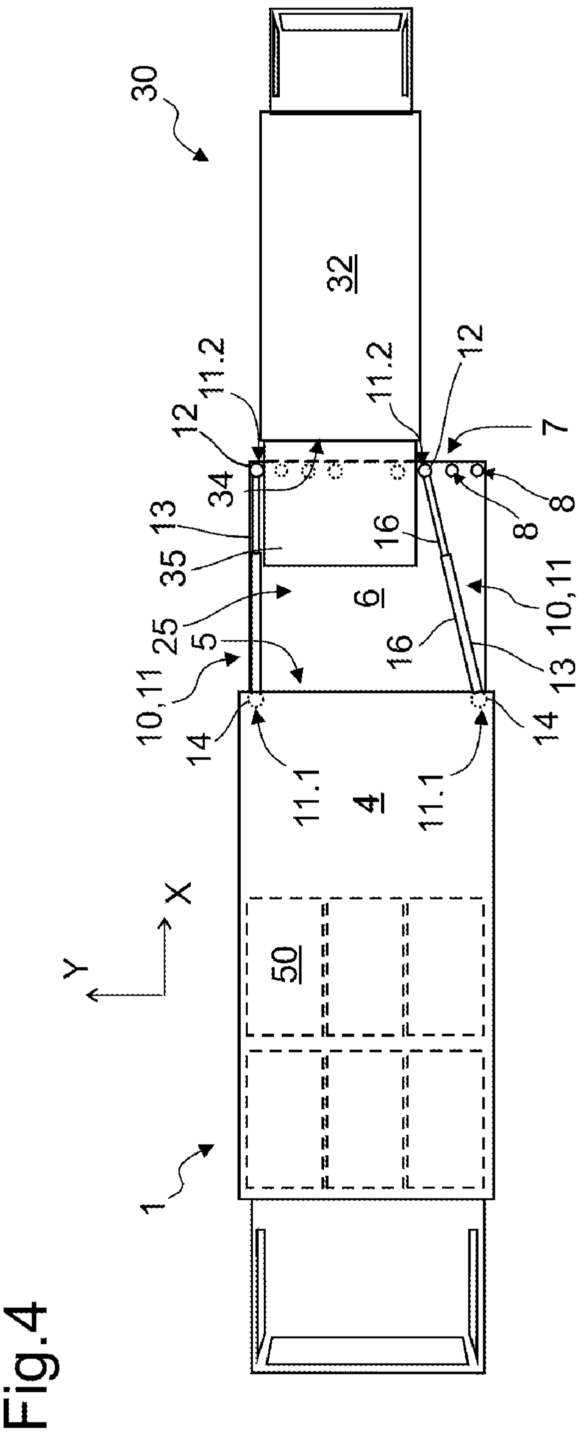
FIG. 4 shows a side view of a utility vehicle having a railing arrangement according to a second embodiment, and of a further utility vehicle, during a payload exchange.
Figure 7:
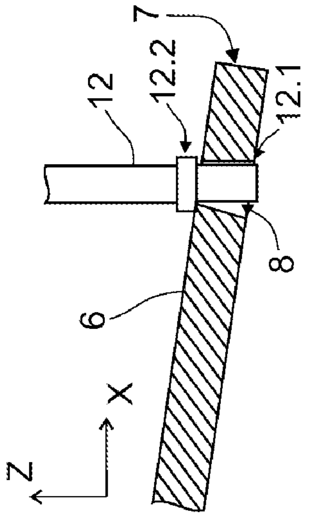
FIG. 7 is a partial sectional illustration of the loading platform from FIG. 5 and of the post element in a second position.
Figure 6:
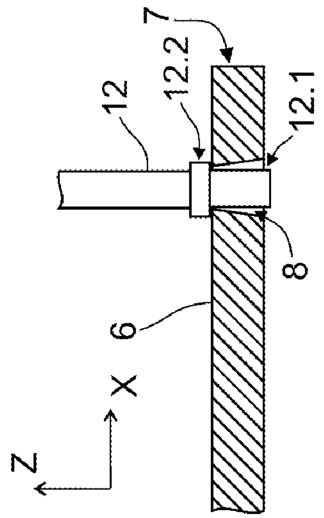
FIG. 6 is a partial sectional illustration of the loading platform from FIG. 5 and of a post element in a first position.
Figure 5:
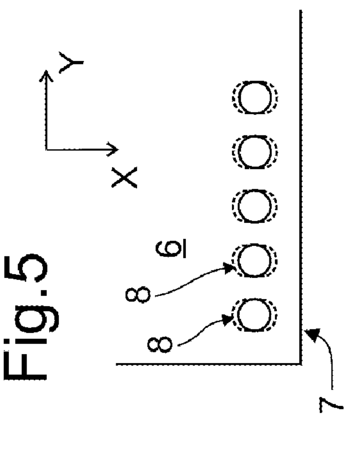
FIG. 5 shows a plan view of a part of the loading platform of the utility vehicle from FIG. 4.

FIG. 4 shows a plan view, corresponding to FIG. 2, of a truck 1 and of an LEFV 30. In this case, the truck 1 has a second embodiment of a railing arrangement 10 according to the invention, which differs from the first embodiment in that the handrail elements 13 are not entirely rigid but have two telescopically interconnected segments 16. In this way, a length of the handrail element 13 can be adapted. It is thus possible in this exemplary embodiment for the apertures 8 in the loading platform 6 to be arranged not along a circular arc but along a straight line parallel to the end edge 7. FIG. 5 shows an enlarged detail view of the loading platform 6 with a number of apertures 8. At a top side, the apertures 8 have a circular cross section, which however widens, in the longitudinal direction X, toward the bottom side. FIGS. 6 and 7 show partial sectional illustrations of the loading platform 6 and of a post element 12 that has been inserted with a foot portion 12.1 into the aperture 8. A flange portion 12.2 above the foot portion 12.1 prevents the post element 12 from being inserted further into, or slipping through, the aperture 8. At the top side of the loading platform 6, the dimensions of the aperture 8 correspond, aside from a certain clearance, to the circular cross section of the foot portion 12.1. Toward the bottom side, the dimensions of the aperture 8 in the transverse direction Y substantially correspond to the diameter of the foot portion 12.1, whilst a certain degree of play exists in the longitudinal direction X. The post element 12 is thus pivotable relative to the loading platform 6, within certain limits, about the transverse direction Y. It is thus possible for the post element to be arranged vertically irrespective of whether the loading platform is arranged horizontally, as in FIG. 6, or has been downwardly inclined in order to compensate for a height difference, as in FIG. 7.

Figure 8:
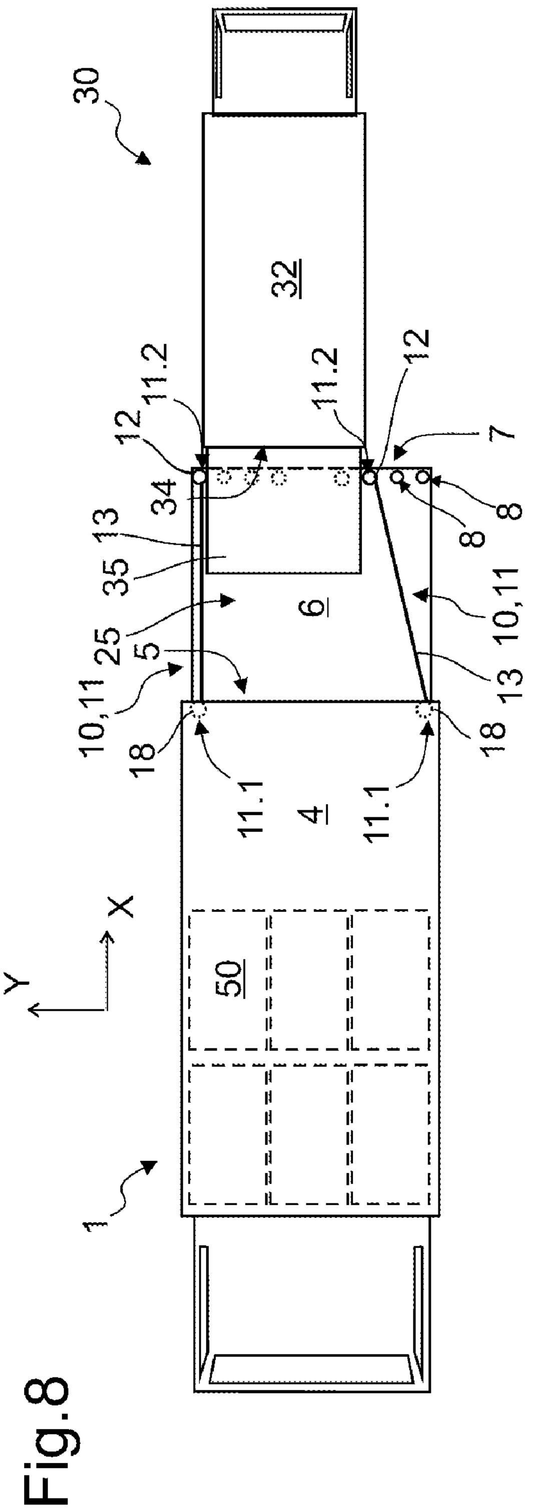
FIG. 8 shows a side view of a utility vehicle having a railing arrangement according to a third embodiment, and of a further utility vehicle, during a payload exchange.
Figure 9:
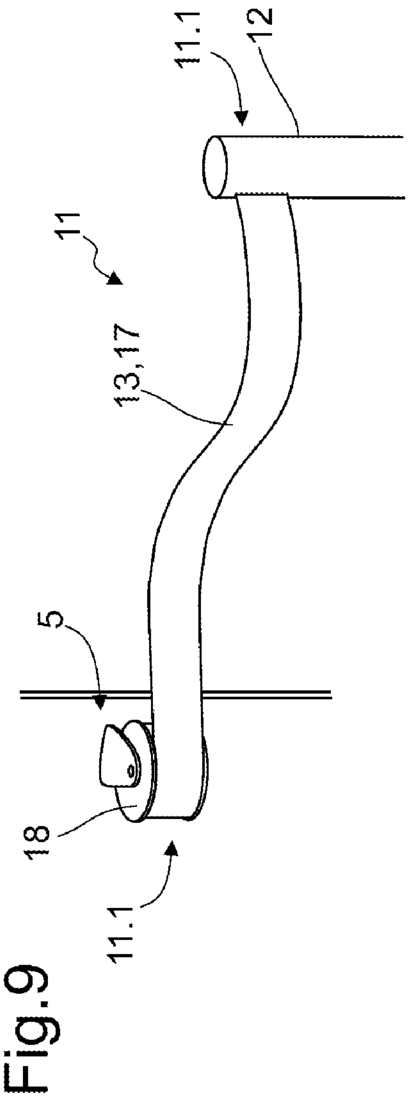
FIG. 9 shows a perspective view of a part of the railing arrangement from FIG. 8.

FIGS. 8 and 9 illustrate a third embodiment of a railing arrangement 10 according to the invention, in which the handrail elements 13 are formed by flexible strap elements 17 that may for example be woven from synthetic fibers. Each strap element 17 can be rolled up on a spool unit 18 that is arranged, and rotatably mounted, on the truck 1 to the side of the loading opening 5. The spool unit 18 may firstly be preloaded by means of a spring element, which assists an automatic winding-up operation, and said spool unit secondly has an arresting mechanism (not illustrated here) by means of which its rotational movement can be arrested such that an unwound length of the strap element 17 can be fixed. In this case, the strap element 17 is fixedly connected to a post element 12 that can be selectively inserted, as already presented, into different apertures 8 within the loading platform 6.

Figure 10:
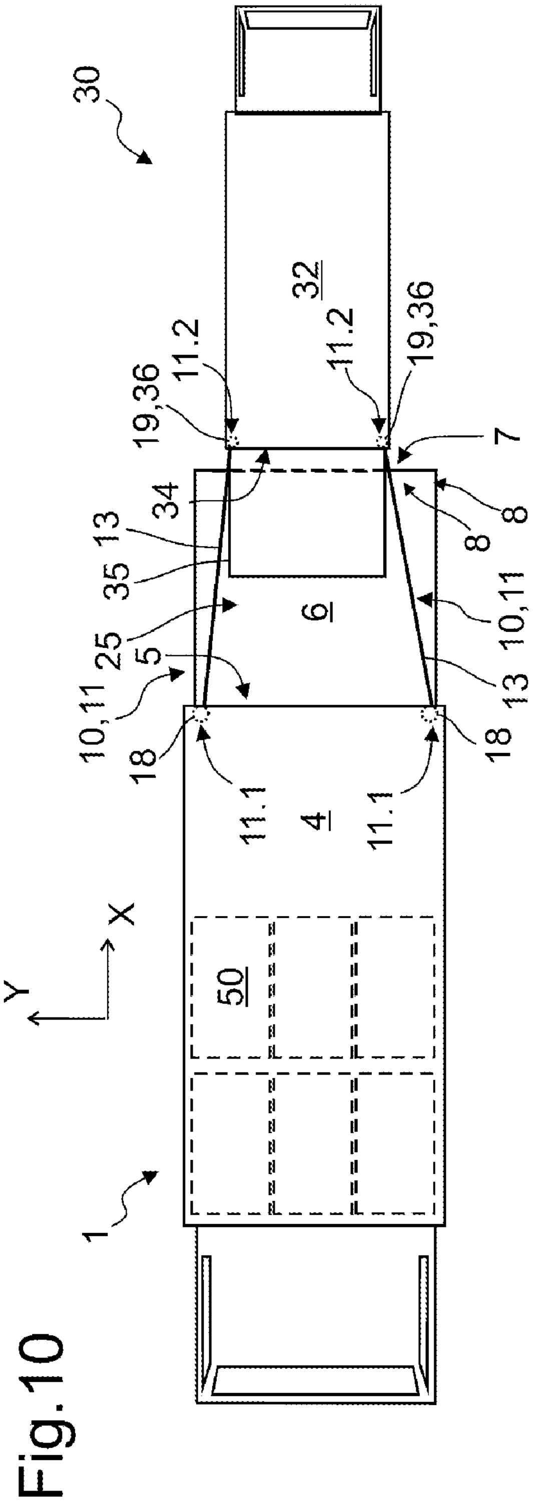
FIG. 10 shows a side view of a utility vehicle having a railing arrangement according to a fourth embodiment, and of a further utility vehicle, during a payload exchange.
Figure 11:
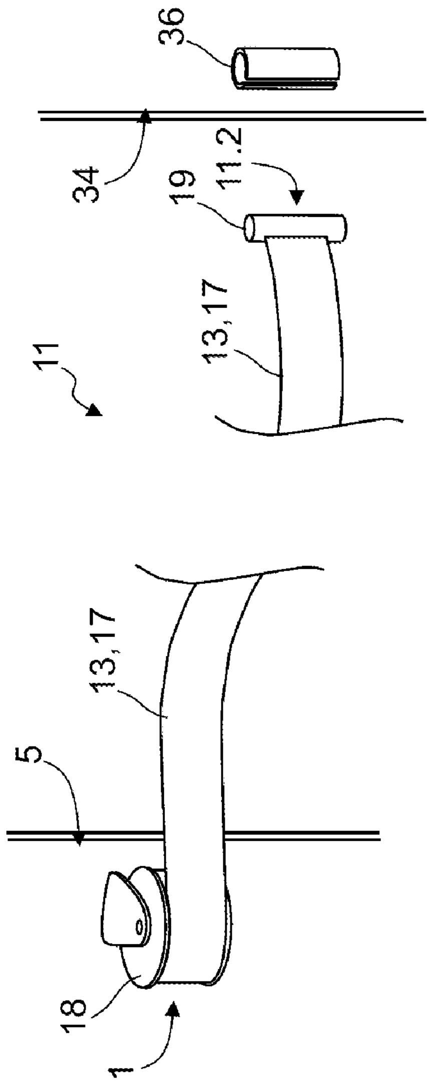
FIG. 11 shows a perspective view of a part of the railing arrangement from FIG. 10.

FIGS. 10 and 11 show a fourth embodiment of a railing arrangement 10 according to the invention, which is similar to the third embodiment, wherein the strap element 17 is however connected at the distal end 11.2 not to a post element 12 but to a securing element 19, which in this case is cylindrical. Said securing element can be inserted into a securing unit 36, designed as a slotted sleeve, to the side of the loading opening 34 of the LEFV 30. To use the railing unit 11, the strap element 17 is unwound to such an extent that the securing element 19 can be inserted into the securing unit 36. After the strap element 17 has been tautened, optionally by the action of an aforementioned spring element, the spool unit 18 is arrested.

Figure 12:
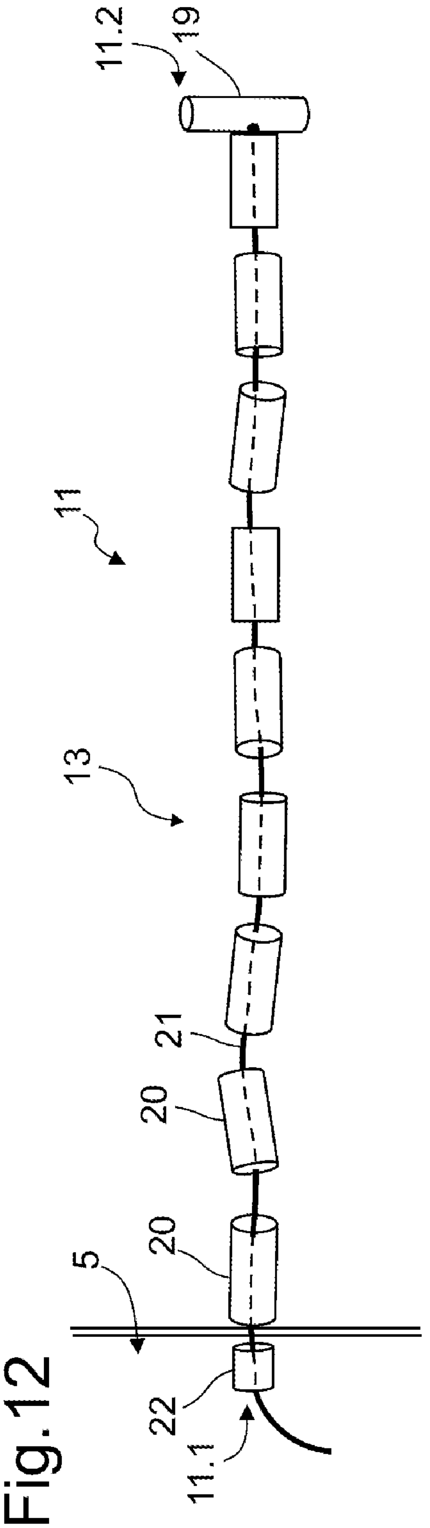
FIG. 12 shows a perspective view of a handrail element of a railing arrangement according to a fifth embodiment in a first state.
Figure 13:
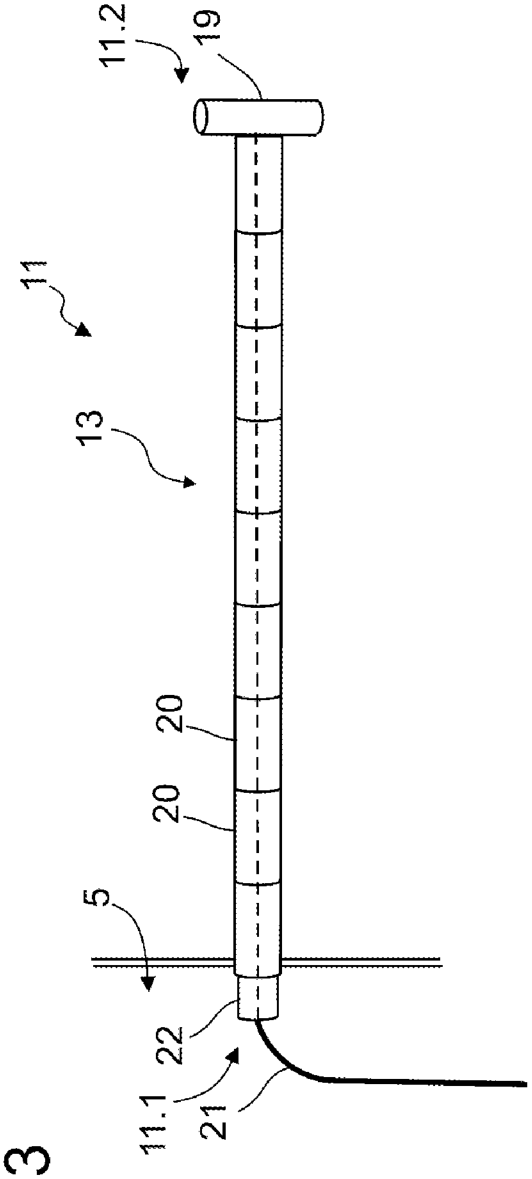
FIG. 13 shows a perspective view of the handrail element from FIG. 12 in a second state.

FIGS. 12 and 13 show a handrail element 11 according to a fifth embodiment of a safety device 10 according to the invention, on the end of which a securing element 19 is again provided. Said securing element is connected to a strap element 21 which in this case is in the form of a cord, and which may for example be formed by a synthetic fiber rope or an encased steel rope. Multiple segments 20 have been threaded onto the strap element 21, or the strap element 21 has been led through the segments 20. Furthermore, the strap element 21 has been led through a receptacle 22 that is fastened to the truck 1 to the side of the loading opening 5. FIG. 12 shows a state in which the segments 20 have been separated and the handrail element 11 as a whole can thus be stowed in space-saving fashion. FIG. 13 shows a state in which the strap element 21 has been pulled through the receptacle 22 to such an extent that all of the segments 20 bear form-fittingly against one another and form a substantially rigid unit for as long as the strap element 21 is held under tension. To ensure this, the receptacle 22, which is merely schematically illustrated here, may have an arresting mechanism. As an alternative to the securing element 19 shown here, it would also be possible for a post element 12 to be provided on the distal end 11.2.

LIST OF REFERENCE SYMBOLS

1 Truck
2, 31 Vehicle body
3, 32 Cargo floor
4, 33 Cargo space
5, 34 Loading opening
6 Loading platform
7 End edge
8, 9 Aperture
10 Railing arrangement
11 Railing unit
11.1 Proximal end
11.2 Distal end region
12 Post element
12.1 Foot portion
12.2 Flange portion
13 Handrail element
14 Pivot bearing
15 Guide rail
16 Telescopic segment
17 Strap element
18 Transverse connecting element
19 Securing element
20 Rigid segment
21 Strap element
25 Walkable area
30 LEFV
35 Bridging element
36 Securing unit
40 Person
50 Trolley
X Longitudinal direction
Y Transverse direction
Z Vertical direction

What is claimed is:

1. A vehicle comprising:
a vehicle body comprising a cargo space and a loading opening;
a loading platform coupled to the vehicle body and movable relative to the vehicle body between a storage position and a loading position; and
a railing arrangement coupled to the vehicle body and movable relative to the vehicle body between a non-use configuration and a use configuration, the railing arrangement comprising:
at least a first railing unit and a second railing unit, wherein proximal ends of each of the first railing unit and the second railing unit are coupled to respective sides of the loading opening in a transverse direction of the vehicle, and wherein distal ends of each of the first railing unit and the second railing unit are configured to be removably coupled to the loading platform, in the loading position, in a region of a distal end edge of the loading platform, such that at least the first railing unit is inclined toward the transverse direction in relation to a longitudinal direction of the vehicle,
wherein the railing arrangement, in the use configuration, extends distally away from the loading opening in the longitudinal direction, and wherein the first railing unit and the second railing unit define a walkable area that becomes narrower, in the transverse direction toward the distal end edge.

2. The vehicle of claim 1, wherein the first railing unit comprises a flexible handrail element that can be rolled up when not in use.

3. The vehicle of claim 2, wherein the flexible handrail element is configured to be rolled up on a spool unit that is arranged on the vehicle body and is arrestable in order to fix an unrolled length of the flexible handrail element.

4. The vehicle of claim 1, wherein the first railing unit comprises a handrail element having multiple telescopically interconnected segments.

5. The vehicle of claim 1, wherein the first railing unit comprises a handrail element having multiple rigid segments that are connected by at least one flexible strap element and are couplable to one another for use and decouplable from one another when not in use.

6. The vehicle of claim 1, wherein the loading platform comprises a plurality of first apertures and a plurality of second apertures disposed in the region of the distal end edge, wherein the distal end of the first railing unit is configured to be removably coupled to the loading platform, in the loading position, via one of the first apertures, and wherein the distal end of the second railing unit is configured to be removably coupled to the loading platform, in the loading position, via one of the second apertures.

7. The vehicle of claim 6, wherein the vehicle body comprises a third aperture and a fourth aperture disposed in the cargo space, wherein the distal end of the first railing unit is further configured to be removably coupled to the vehicle body via the third aperture, and wherein the distal end of the second railing unit is further configured to be removably coupled to the vehicle body via the fourth aperture.

8. The vehicle of claim 1, wherein the first railing unit comprises a handrail element and a post element coupled to the handrail element, and wherein the post element is configured to be removably coupled to the loading platform.

9. The vehicle of claim 1, wherein the loading platform comprises multiple connecting structures disposed in the region of the distal end edge, and wherein the distal end of the first railing unit is configured to be selectively coupled to the loading platform, in the loading position, via each of the multiple connecting structures.

10. The vehicle of claim 1, wherein the proximal end of the first railing unit is height-adjustably coupled and/or pivotably coupled to the vehicle body.

11. A vehicle comprising:

a vehicle body comprising a cargo space and a loading opening;

a loading platform coupled to the vehicle body and movable relative to the vehicle body between a storage position and a loading position; and a railing arrangement coupled to the vehicle body and movable relative to the vehicle body between a non-use configuration and a use configuration, wherein the railing arrangement, in the non-use configuration, is disposed within the cargo space, wherein the railing arrangement, in the use configuration, extends distally away from the loading opening in a longitudinal direction of the vehicle, and wherein the railing arrangement comprises:

at least a first railing unit and a second railing unit, wherein proximal ends of each of the first railing unit and the second railing unit are coupled to respective sides of the loading opening in a transverse direction of the vehicle, and wherein distal ends of each of the first railing unit and the second railing unit are configured to be removably coupled to the loading platform, in the loading position, in a region of a distal end edge of the loading platform, such that at least the first railing unit is inclined toward the transverse direction in relation to the longitudinal direction, and wherein the first railing unit and the second railing unit define a walkable area that becomes narrower, in the transverse direction toward the distal end edge.

12. The vehicle of claim 11, wherein the first railing unit comprises a flexible handrail element that can be rolled up when not in use.

13. The vehicle of claim 12, wherein the flexible handrail element is configured to be rolled up on a spool unit that is arranged on the vehicle body and is arrestable in order to fix an unrolled length of the flexible handrail element.

14. The vehicle of claim 11, wherein the first railing unit comprises a handrail element having multiple telescopically interconnected segments.

15. The vehicle of claim 11, wherein the first railing unit comprises a handrail element having multiple rigid segments that are connected by at least one flexible strap element and are couplable to one another for use and decouplable from one another when not in use.

16. The vehicle of claim 11, wherein the loading platform comprises a plurality of first apertures and a plurality of second apertures disposed in the region of the distal end edge, wherein the distal end of the first railing unit is configured to be removably coupled to the loading platform, in the loading position, via one of the first apertures, and wherein the distal end of the second railing unit is configured to be removably coupled to the loading platform, in the loading position, via one of the second apertures.

17. The vehicle of claim 16, wherein the vehicle body comprises a third aperture and a fourth aperture disposed in the cargo space, wherein the distal end of the first railing unit is further configured to be removably coupled to the vehicle body via the third aperture, and wherein the distal end of the second railing unit is further configured to be removably coupled to the vehicle body via the fourth aperture.

18. The vehicle of claim 11, wherein the first railing unit comprises a handrail element and a post element coupled to the handrail element, and wherein the post element is configured to be removably coupled to the loading platform.

19. The vehicle of claim 11, wherein the loading platform comprises multiple connecting structures disposed in the region of the distal end edge, and wherein the distal end of the first railing unit is configured to be selectively coupled to the loading platform, in the loading position, via each of the multiple connecting structures.

20. The vehicle of claim 11, wherein the proximal end of the first railing unit is height-adjustably coupled and/or pivotably coupled to the vehicle body.

* * * * *